No. 622,420. Patented Apr. 4, 1899.
J. F. FISHER.
WIND WHEEL.
(Application filed Apr. 25, 1898.)
(No Model.) 2 Sheets—Sheet 1.
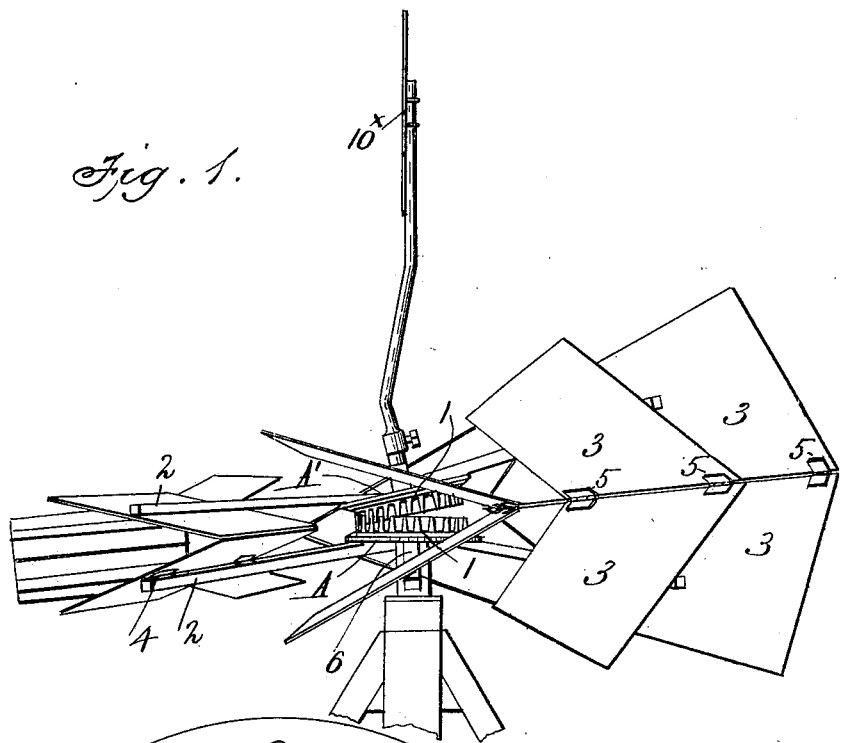
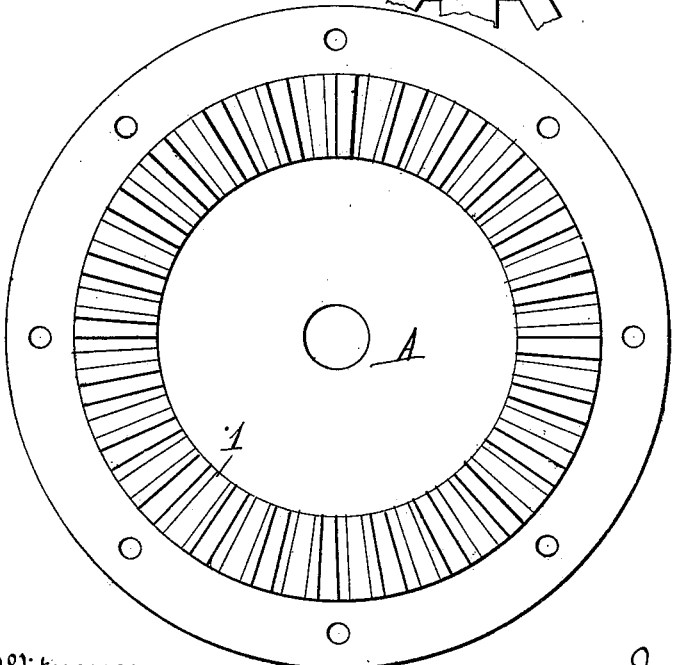
Witnesses
Franck L. Ourand
S. F. Marshall
Inventor
John F. Fisher
By A. G. Keyfmun.
Attorney No. 622,420. Patented Apr. 4, 1899.
J. F. FISHER.
WIND WHEEL.
(Application filed Apr. 25, 1898.)

(No Model.) 2 Sheets—Sheet 2.

Witnesses
Franck L. Ourand
S. F. Marshall

Inventor
John F. Fisher
by A. G. Heylmun,
Attorney

UNITED STATES PATENT OFFICE.

JOHN F. FISHER, OF ATCHISON, KANSAS.

WIND-WHEEL.

SPECIFICATION forming part of Letters Patent No. 622,420, dated April 4, 1899.

Application filed April 25, 1898. Serial No. 678,769. (No model.)

*To all whom it may concern:*

Be it known that I, JOHN F. FISHER, a citizen of the United States of America, residing at Atchison, in the county of Atchison, in the State of Kansas, have invented a new and useful Wind-Wheel, of which the following is a specification.

My invention has relation to improvements in wind-wheels; and the object is to provide a new and useful wheel which is simple in construction, efficient and certain in operation, and which will feather and present its expansible blades by positive motion or independent of the action of the wind and be closed by the same agencies, actions, and with equal positiveness by the associated mechanism. I accomplish these objects by the constructions and mechanism illustrated in the accompanying drawings, wherein—

Figure 2:
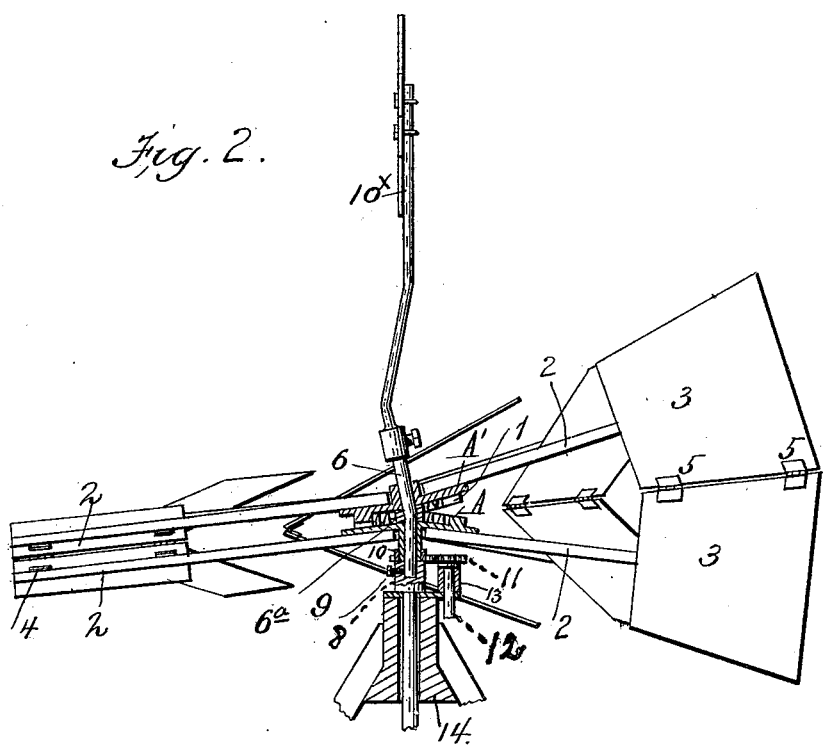
Figure 5:
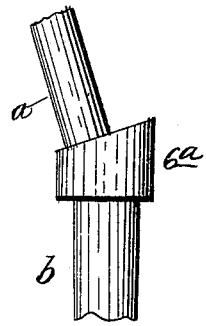
Figure 3:
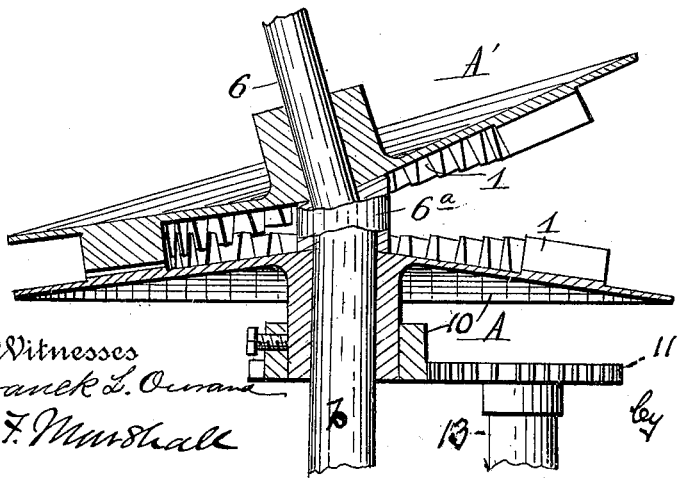

Figure 1 is a perspective of my new windwheel as operatively set up, the connecting gearing of the hub being omitted from the illustration. Fig. 2 is a cross-section through the wheel and its two-part hub. Fig. 3 is a detail view in cross-section through the hubs, on enlarged scale. Fig. 4 is a plan view of one of the hub-disks. Fig. 5 is a detail view of the bent shaft removed from the hubs.

A A' designate the disks constituting the hub of the wheel. These hub-disks consist of substantial circular concavo-convex plates or disks of suitable metal arranged with their convex surfaces in juxtaposition and formed with intermeshing face gear-teeth 1. To the concave faces of each hub-disk are strongly secured the inner ends of the wheel-arms 2, and to the outer ends of each pair of registering arms are secured the blades 3 3, the connections being pivotally made by hinges 4 or other suitable and similar connections. These connections are disposed substantially at the radial middle of each section of the blades. The inner meeting and parallel edges of each section or half of the blades are hinged together by two or more hinges 5, so that as the blades feather open they will present an extended surface for the force of the wind to act against and so that they may be closed on the return side to prevent the least obstruction on that side of the wheel. This opening-and-closing action is positive and attained by the particular construction of the shaft on which the wheel is mounted. The hub-shaft 6 is bent or shaped angular lengthwise and provided with an annular bearing $6^a$ at its middle, or at the part sitting between the hub-disks, to support the upper hub-disks and separate the disks and maintain them at a proper relative operative distance apart. The lower part $b$ of the shaft 6 is made larger in diameter than the upper part $a$ in order that the shaft may be held strongly in its bearings and afford ample bearing surface and support for the lower hub-disk of the wheel. The part $b$ of the bent shaft extends below the hub of the lower disk and has its bearing in a socket piece or bearing 8, having its stem arranged in the crown piece or casting 14 of the tower or frame, as indicated in Fig. 2 of the drawings, and a set-screw 9 holds the parts together, but so that the bent shaft may be turned by the vane. The hub-disks rotate on the shaft 6, the lower hub having bearing on the top of the socket-piece and the upper one resting on the incline of the bearing or collar $6^a$, which incline keeps the upper disk always in mesh with the lower at the proper point of engagement. On the hub of the lower disk may be secured or formed a toothed gear 10, arranged to mesh with a counter-gear 11, having its axle or shaft 12 suitably supported in a vertical bearing 13, and the shaft 12 may carry any proper gear connected to the pump mechanism in any well-known manner. The part $b$ of shaft 6 stands vertical, as seen in the drawings, which throws the part $a$ at such incline as to keep the teeth of the hub-disks in engagement at the point essential to produce positive and regular action of the blades. On the upper end of the part $a$ of the shaft 6 is suitably secured a vane $10^\times$, the stem or support of the vane being shaped or bent so as to stand substantially vertical and when connected to the shaft is rigid therewith, with the vane in horizontal direction, and is disposed in relation thereto and to the wheel in its original or primary connection and disposition that the vane will stand with its point toward the person with the open blades to the right. When the vane is so arranged and secured, subsequent shifting of the wind will not change the relations of the vane to the wheel, but the opened blades will always be to the same relative side of the vane as set.

I have not shown the usual or other mechanism in connection with the pump or mechanism to be operated, as such connections are well known and form no part of my present invention. They may be of any character to effect the purposes now in use in such machines.

What I claim is—

1. A wheel of the character described, comprising a two-part hub, a bent shaft to hold the parts of the hub in inclined relative position, arms secured to each part of the hub, blades hinged to the outer part of each pair of alining arms and their inner adjacent edges hinged together.

2. A wheel of the character described, comprising a bent shaft, hub-disks mounted on each section of the shaft, arms on the disks, and blades on the arms hinged thereto and having their inner meeting edges hinged together.

3. A wheel of the character described, comprising a bent shaft, a concavo-convex hub-disk mounted on each section of the shaft having their convex faces in juxtaposition and provided with intermeshing face-gear, arms on the hub-disks, and hinged blades on the arms.

In witness whereof I have hereunto set my hand in the presence of two witnesses.

J. F. FISHER.

Attest:
    J. B. MORRIS,
    J. F. STUCKER.